(12) United States Patent
Yamada et al.

(10) Patent No.: US 8,977,877 B2
(45) Date of Patent: Mar. 10, 2015

(54) IMAGE PROCESSING APPARATUS, COMMUNICATION METHOD THEREFOR, AND RECORDING MEDIUM

(75) Inventors: Masami Yamada, Sennan-gun (JP); Keisuke Teramoto, Itami (JP); Hiroaki Kubo, Muko (JP); Atsushi Ohshima, Amagasaki (JP); Yoshiaki Shibuta, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 365 days.

(21) Appl. No.: 13/556,882

(22) Filed: Jul. 24, 2012

(65) Prior Publication Data

US 2013/0031395 A1    Jan. 31, 2013

(30) Foreign Application Priority Data

Jul. 26, 2011  (JP) .................. 2011-163749

(51) Int. Cl.
  *G06F 1/32*  (2006.01)
  *H04L 12/12*  (2006.01)
(52) U.S. Cl.
  CPC ........... *H04L 12/12* (2013.01); *Y02B 60/34* (2013.01); *Y02B 60/32* (2013.01)
  USPC ......................................... 713/321; 713/323
(58) Field of Classification Search
  USPC .................................................. 713/321, 323
  See application file for complete search history.

(56) References Cited

U.S. PATENT DOCUMENTS

| 7,574,619 B2 | 8/2009 | Senda |
| 7,640,441 B2 | 12/2009 | Maeda |
| 8,295,194 B2 * | 10/2012 | Huang et al. .................. 370/252 |
| 8,312,307 B2 * | 11/2012 | Hays ............................. 713/323 |
| 2012/0188885 A1 * | 7/2012 | Tazebay et al. ............... 370/252 |

FOREIGN PATENT DOCUMENTS

| JP | 2004-048532 A | 2/2004 |
| JP | 2006-293983 A | 10/2006 |
| JP | 2007-276341 A | 10/2007 |
| JP | 2010-232724 A | 10/2010 |
| JP | 2011-124788 A | 6/2011 |

OTHER PUBLICATIONS

Office Action (Notification of Reasons for Refusal) issued on Oct. 8, 2013, by the Japanese Patent Office in corresponding Japanese Patent Application No. 2011-163749, and an English Translation of the Office Action. (4 pages).

* cited by examiner

*Primary Examiner* — Thuan Du
(74) *Attorney, Agent, or Firm* — Buchanan Ingersoll & Rooney PC

(57) ABSTRACT

An image processing apparatus being configured to support a power-saving mode which allows achieving low power consumption while keeping an idle connection without communication between the image processing apparatus and a communication device in a network environment, comprises: a first judgment portion which judges whether or not the communication device supports the power-saving mode; and a communicator which establishes a connection to the communication device at a first communication rate if the first judgment portion judges that the communication device does not support the power-saving mode, at a second communication rate which is faster than the first communication rate if the first judgment portion judges that the communication device supports the power-saving mode.

9 Claims, 5 Drawing Sheets

| Protocol | Rate | Period of Sleep State Ts($\mu$ sec) | | Period of Quiet State Tq($\mu$ sec) | | Period of Refresh State Tr($\mu$ sec) | |
|---|---|---|---|---|---|---|---|
| | | min | max | min | max | min | max |
| 100BASE-TX | 100Mbps | 200 | 220 | 20,000 | 22,000 | 200 | 220 |
| 1000BASE-T | 1Gbps | 182.0 | 202.0 | 20,000 | 24,000 | 182.0 | 218.2 |
| 10GBASE-T | 10Gbps | 2.88 | 3.20 | 39.70 | 39.68 | 1.28 | 1.28 |

1

IMAGE PROCESSING APPARATUS, COMMUNICATION METHOD THEREFOR, AND RECORDING MEDIUM

This application claims priority under 35 U.S.C. §119 to Japanese Patent Application No. 2011-163749 filed on Jul. 26, 2011, the entire disclosure of which is incorporated herein by reference in its entirety.

BACKGROUND OF THE INVENTION

1. Field of the Invention

The present invention relates to: an image processing apparatus such as a multifunctional machine, a printer, a facsimile, or a MFP (Multi Function Peripheral) collectively having these functions; a communication method for the image processing apparatus; and a recording medium with a communication program stored on the image processing apparatus.

2. Description of the Related Art

The following description sets forth the inventor's knowledge of related art and problems therein and should not be construed as an admission of knowledge in the prior art.

In recent years, people use such an image processing apparatus as described above more often in the network environment by connecting it to communication devices such as network switches and hubs.

ErP Directive Lot 6, European Commission's eco-design directive aiming at reducing the environmental impact of energy-related products (ErPs), requires such MFPs as described above reduce stand-by power consumption to a predetermined value or below in a phased fashion.

Although ErP Directive Lot 26, which relates to network stand-by losses, does not mention power consumption just like Lot 6, it should be preferred to reduce power consumption at least to the same level as Lot 6 in order to achieve energy-saving, also while such MFPs are connected to the network.

Actually, while such MFPs are connected to the network without packet communication, the physical layer device (also to be referred to as PHY [abbreviation of "physical layer"]), which is the lowest layer in computer networking, consumes nearly the same amount of power as it does while they are connected to the network performing packet communication: 500 mW with the communication rate of 1 Gbps (bps: bits per second), 500 mW with the communication rate of 100 Mbps.

IEEE 802.3az to be publicly introduced soon is suggesting a new standard power-saving mode (LPI [Low Power Idle] mode) aiming to achieve low power consumption while keeping an idle connection without communication. By using this power-saving mode, the physical layer consumes only 100 mW or below while keeping an idle connection without communication.

However, it depends on available features of communication devices on the other end of the connection; if communication, devices on the other end of the connection, capable of communication of up to 1 Gbps, do not support the new standard mode, the physical layer would consume as much power as ever, almost 500 mV. This would lead to a sleep power consumption of more than 0.5 W, not achieving power savings. The communication rate of the image processing apparatuses may be adjusted to up to 100 Mbps in order to achieve power savings. Then, however, even if the communication devices on the other end of the communication, which are capable of up to 1 Gbps, support the new standard mode, there would be another problem: the image processing apparatuses could perform even data communication only at up to 100 Mbps.

Disclosed in Japanese Unexamined Patent Publication No. 2007-276341 is a printing apparatus which slows down the rate to communicate with other communication devices, before switching to power-saving mode. Specifically, a printing apparatus, which is provided with a controller instructing a LAN controller to control the communication rate, is configured to instruct the LAN controller to slow down the communication rate if judging the power supply mode should be canceled in order not to provide power to the controller. After that, a power supply cuts down power to the controller.

Disclosed in Japanese Unexamined Patent Publication No. 2006-293983 is a technology for a network communication device to adjust the communication rate immediately without any communication errors when switching to energy-saving mode such as power-saving mode. Specifically, when switching to energy-saving mode, a network communication device cuts down the signaling link to the other end of the connection by employing loopback mode; select a communication rate within the range of available communication rates from both ends of the connection, which is slower than that in regular mode; and auto-negotiate with the other end by cancelling loopback mode. Here, by auto-negotiation, the network communication device applies the communication rate slower than that in regular mode, which is selected by the network communication device itself, to the other end of the connection in order to perform communication therewith at the slower communication rate.

Disclosed in Japanese Unexamined Patent Publication No. 2004-048532 is a technology for a network interface device to achieve low power consumption of an entire network system by freely switching the power state of the network interface device itself, between regular state and power-saving state. In this network system: a primary apparatus, which is capable of being attached to by the network interface device, performs communication with another apparatus via a network; and the network interface device monitors by its own signal sensor a packet signal coming into the primary apparatus after being filtered by a switch or hub and controls by its own clock controller the clock frequency applied to its own CPU.

Conventionally, as described above, there are the following problems: even an image processing apparatus such as a MFP, having power-saving function, cannot achieve low power consumption if a communication device on the other end of the connection does not have power-saving function, too; and an image processing apparatus, which is configured to perform communication at a low rate, can perform even data communication only at up to that low rate, even if a communication device on the other end of the connection has power-saving function, too.

In addition, with the technologies from Japanese Unexamined Patent Publications No. 2007-276341 and No. 2006-293983, there is another problem: changing the communication rate before and after switching between power-saving mode and regular mode may cause packet loss due to a link-down. Also, with the technology from Japanese Unexamined Patent Publication No. 2004-048532, there is another problem: the CPU of a network interface apparatus needs to change the clock frequency before and after switching between power-saving mode and regular mode. Therefore, the technologies from Japanese Unexamined Patent Publications No. 2007-276341, No. 2006-293983, and No. 2004-048532 do not provide perfect solutions to the following problems: even an image processing apparatus such as a MFP, having power-saving function, cannot achieve low power consumption if a communication device on the other end of the connection does not have power-saving function, too; and an image processing apparatus, which is configured to perform communication at a low rate, can perform even data communication at that low rate even if a communication device on the other end of the connection has power-saving function, too.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

A first aspect of the present invention is an image processing apparatus being configured to support a power-saving mode which allows achieving low power consumption while keeping an idle connection without communication between the image processing apparatus and a communication device in a network environment, the image processing apparatus comprising:
 a first judgment portion which judges whether or not the communication device supports the power-saving mode; and
 a communicator which establishes a connection to the communication device at a first communication rate if the first judgment portion judges that the communication device does not support the power-saving mode, at a second communication rate which is faster than the first communication rate if the first judgment portion judges that the communication device supports the power-saving mode.

A second aspect of the present invention is a communication method for an image processing apparatus being configured to support a power-saving mode which allows achieving low power consumption while keeping an idle connection without communication between the image processing apparatus and a communication device in a network environment, the communication method comprising:
 judging whether or not the communication device supports the power-saving mode; and
 establishing a connection to the communication device at a first communication rate if it is judged that the communication device does not support the power-saving mode, at a second communication rate which is faster than the first communication rate if it is judged that the communication device supports the power-saving mode.

A third aspect of the present invention is a non-transitory computer-readable recording medium with a communication program being stored thereon to make a computer of an image processing apparatus being configured to support a power-saving mode which allows achieving low power consumption without communication while keeping an idle connection without communication between the image processing apparatus and a communication device in a network environment, execute:
 judging whether or not the communication device supports the power-saving mode; and
 establishing a connection to the communication device at a first communication rate if it is judged that the communication device does not support the power-saving mode, at a second communication rate which is faster than the first communication rate if it is judged that the communication device supports the power-saving mode.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, some embodiments of the present invention will be described with reference to the accompanying drawings.

Figure 1:
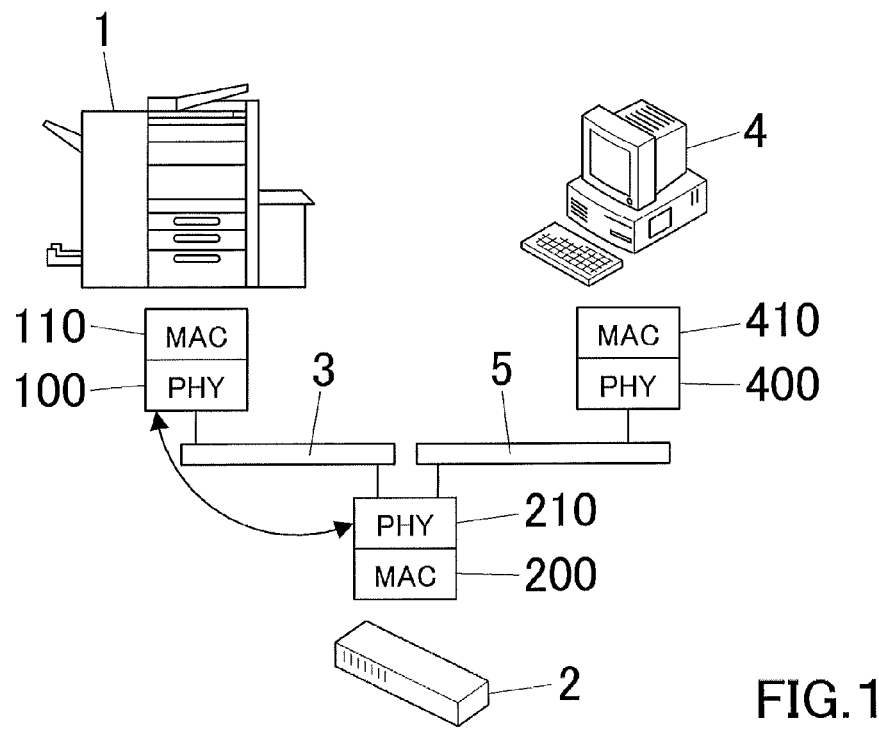
FIG. 1 is a view illustrating an image processing apparatus according to a first embodiment of the present invention, connected to a communication device.

FIG. 1 illustrates an image processing apparatus 1 according to a first embodiment of the present invention, which is connected to a communication device 2.

As illustrated in FIG. 1, the image processing apparatus 1 is connected to the communication device 2 which is a network switch or hub for example, via a medium 3 such a LAN cable, in order to be operated in the network environment. In this embodiment, a terminal 4 which is constituted by a personal computer is further connected to the communication device 2 via a medium 5 such as a LAN cable.

Furthermore, in this embodiment, the image processing apparatus 1 is constituted by such a MFP as described above, collectively having multiple functions such as copier, printer, and facsimile functions.

In FIG. 1, PHY 100 and MAC 110 indicate a physical layer device 100 and a MAC device 110 of the image processing apparatus 1, which later will be described, respectively. Similarly, while PHY 200 and MAX 210 indicate a physical layer device 200 and a MAC device 210 of the communication device 2, PHY 400 and MAC 410 indicate a physical layer device 400 and a MAC device 410 of the terminal 4.

Figure 2:
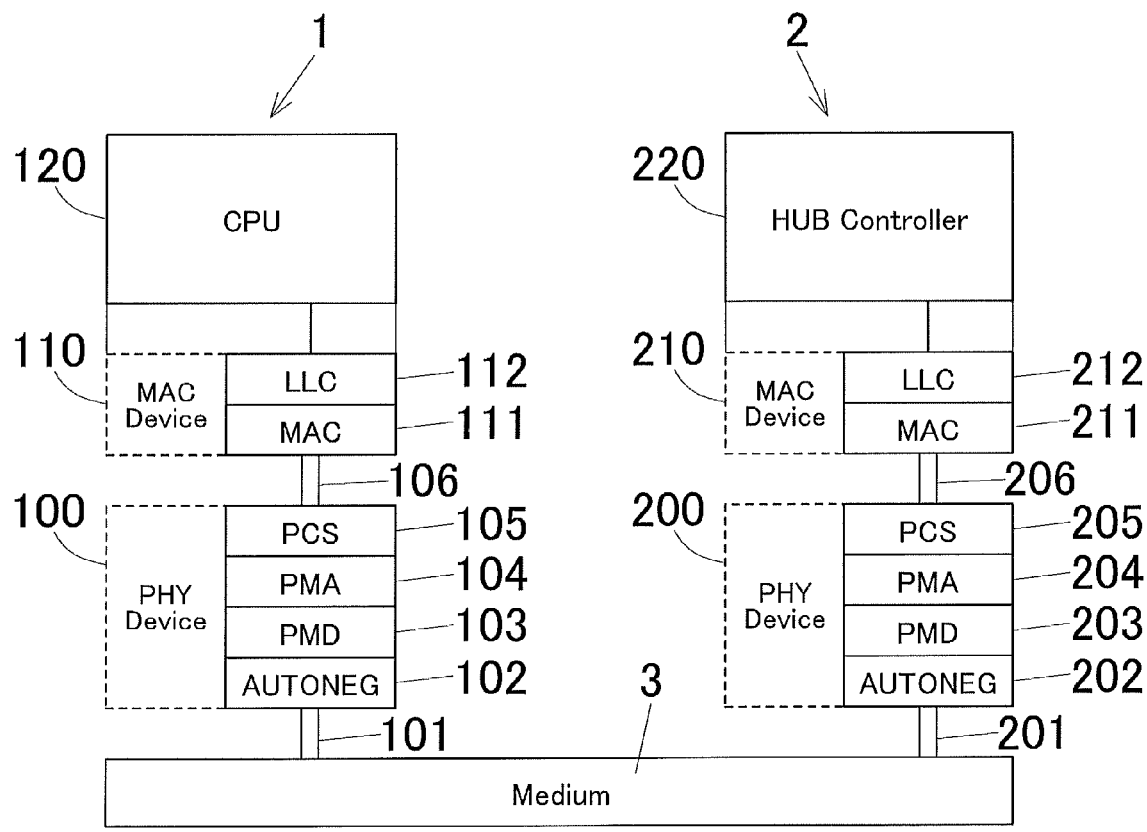
FIG. 2 is a block diagram illustrating a primary part related to communication functions of the image processing apparatus and communication device.

FIG. 2 is a block diagram illustrating a primary part related to communication functions of the image processing apparatus 1 and the communication device 2.

As illustrated in FIG. 2, the image processing apparatus is provided with the physical layer (PHY) device 100, the MAC device 110, and a CPU 120.

The physical layer device 100, which is connected to the medium 3 via a medium-dependent interface (MDI) 101, is provided with: an auto-negotiator (AUTONEG) 102 which auto-negotiates with the communication device 2; a physical medium dependent (PMD) 103; a physical medium attachment (PMA) 104; and a physical coding sublayer (PCS) 105.

The MAC device 110 is provided with: a medium access controller (MAC) 111 and a logical link controller (LLC) 112, both of which are connected to the physical layer device 100 via a medium-independent interface (GM II/GRM II/SGM III) 106.

The CPU 120 controls the entire image processing apparatuses 1 and communication with the networking apparatus 2.

There are various network modes in the connection between the CPU 120 and the MAC device 110; as one of the network types, the CPU 120 and the MAC device 110 may be unified together.

The communication device 2 is provided with: a physical layer device 200, a MAC device 210, and a hub controller 220. The physical layer device 200 and the MAC device 210 have configurations identical with those of the physical layer device 100 and the MAC device 110 of the image processing apparatus 1, respectively. The hub controller 220, which corresponds to the CPU 120 of the image processing apparatus 1, implements functions similar to those of the CPU 120 of the image processing apparatus 1.

There are the following seven modes in the network communication rate: [1] Auto-negotiation; [2] 1000 Mbps (1 Gbps) Full Duplex; [3] 1000 Mbps (1 Gbps) Half Duplex; [4] 100 Mbps Full Duplex; [5] 100 Mbps Half Duplex; [6] 10 Mbps Full Duplex; and [7] 10 Mbps Half Duplex. In this embodiment, another mode, [8] Power Adjustment Mode is additionally given.

To enable the "power adjustment mode", the image processing apparatus 1 needs to support the new standard power-saving mode aiming to achieve low power consumption while keeping an idle connection without communication (hereinafter, this mode will be also referred to as LPI mode).

Hereinafter the LPI mode will be described.

10BASE-T is a network standard for 10 Mbps communication, 1000BASE-T is a network standard for 1000 Mbps (1 Gbps) communication, and 100BASE-TX is a network standard for 100 Mbps communication. There is another network standard for 10 Gbps communication, which will not be explained in this embodiment because of not being employed in the image processing apparatus 1 such as a MFP.

By carrying an idle status signal, 1000BASE-T and 100BASE-TX allow the image processing apparatus 1 to keep an idle connection with the other end of the connection (link) but consuming as much power as it does while communication is active.

More specifically, when using 1000BASE-T which is supposed to be more advanced than 100BASE-TX, the image processing apparatus 1 consumes twice as much power as it does when using 100BASE-TX.

There is a suggestion to achieve low power consumption of the image processing apparatus 1 by switching the network to 100BASE-TX from 1000BASE-T when going to sleep mode from normal operating mode.

However, 100BASE-TX and 1000BASE-T do not use a common signaling protocol. The difference of signaling protocols causes a loss of about 4 seconds in network communication, resulting in discarding the frame (packet) during communication, which is known as "link-down". With TCP/IP protocol, the frame is transmitted again after being discarded. However, many protocols to communicate with the image processing apparatus 1 such as a MFP are supposed to be certain types that cannot transmit the frame again. Therefore, the image processing apparatus 1 possibly may not return a response losing the frame because of a link-down when going to sleep mode from normal operating mode.

In order to solve this problem, IEEE 802.3az introduces a new standard power-saving mode which never causes link-down; the LPI mode that is.

According to IEEE 802.3az, the LPI mode, which is to be added to the existing idle connection modes soon, aims to achieve low power consumption during idle connection, but keeping a link without communication.

Figures 3, 4:
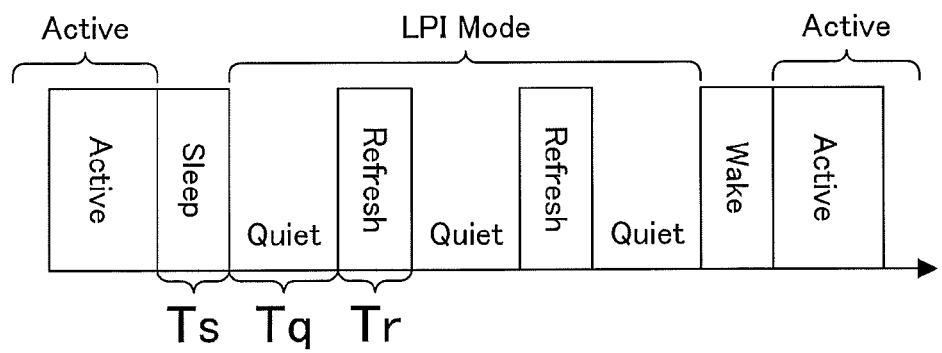
FIG. 3 is a view illustrating changes in the communication state when using the power-saving mode to achieve low power consumption while keeping an idle connection without communication.
FIG. 4 is a table containing standard values about signals outputted by power-saving mode.

FIG. 3 illustrates changes in the communication state when using the LPI mode. In FIG. 3, "LPI Mode" indicates a period of idle connection using the LPI mode, and "Active" indicates a period of data communication.

The LPI mode relates to the following three communication states: "Sleep", "Quiet", and "Refresh". In "Quiet" state, no power can be consumed with the output voltage of 0V during the period of "Quiet" state Tq.

In "Refresh" state, a signal indicating that the link is active is transmitted and received on a periodic basis, between both ends of the connection. The image processing apparatus 1 (the physical layer device 100 of the image processing apparatus 1) on one end of the connection initially auto-negotiate with the communication device 2 on the other end of the connection (the physical layer device 200 of the communication device 2) to examine whether or not the communication device 2 supports the LPI mode, too. If the communication device 2 supports the LPI mode, too, the image processing apparatus 1 transmits a "Sleep" signal to the communication device 2 in its unoccupied time. Then the communication device 2 receives the "Sleep" signal, meaning that now both ends of the connection are ready for the LPI mode. Only a periodic "Refresh" signal is transmitted and received in the LPI mode.

FIG. 4 is a table containing standard values of the period of "Sleep" state Ts, the period of "Quiet" state Tq, and the period of "Refresh" state Tr, all based on 100BASE-TX, 1000BASE-T, and 10GBASE-T.

As is understood from FIG. 4, the image processing apparatus 1 consumes much lower power during the period of "Refresh" state Tr which is very short, than in the existing idle connection modes in which an signal is transmitted and received all the time.

The physical layer device 100 can cancel the LPI mode to enable data communication again, by transmitting a "Wake" signal to the physical layer device 200, and the same is true for the physical layer device 200.

Hereinafter, the "power adjustment mode" will be further described.

After the power is turned ON, the physical layer device 100 of the image processing apparatus 1 auto-negotiates with the physical layer device 200 of the communication device 2 to examine whether or not the physical layer device 200 supports the LPI mode. If the physical layer device 200 supports the LPI mode, the upper limit on the communication rate of the physical layer device 100 is set to 1 Gbps which is a default value. If the physical layer device 200 does not support the LPI mode, the upper limit on the communication rate is set to 100 Mbps by cancelling the register defining 1 Gbp negotiation, which is stored on the physical layer device 100. Then the physical layer device 100 auto-negotiates again with the physical layer device 200 to switch the communication rate to 100 Mbps.

Figure 5:
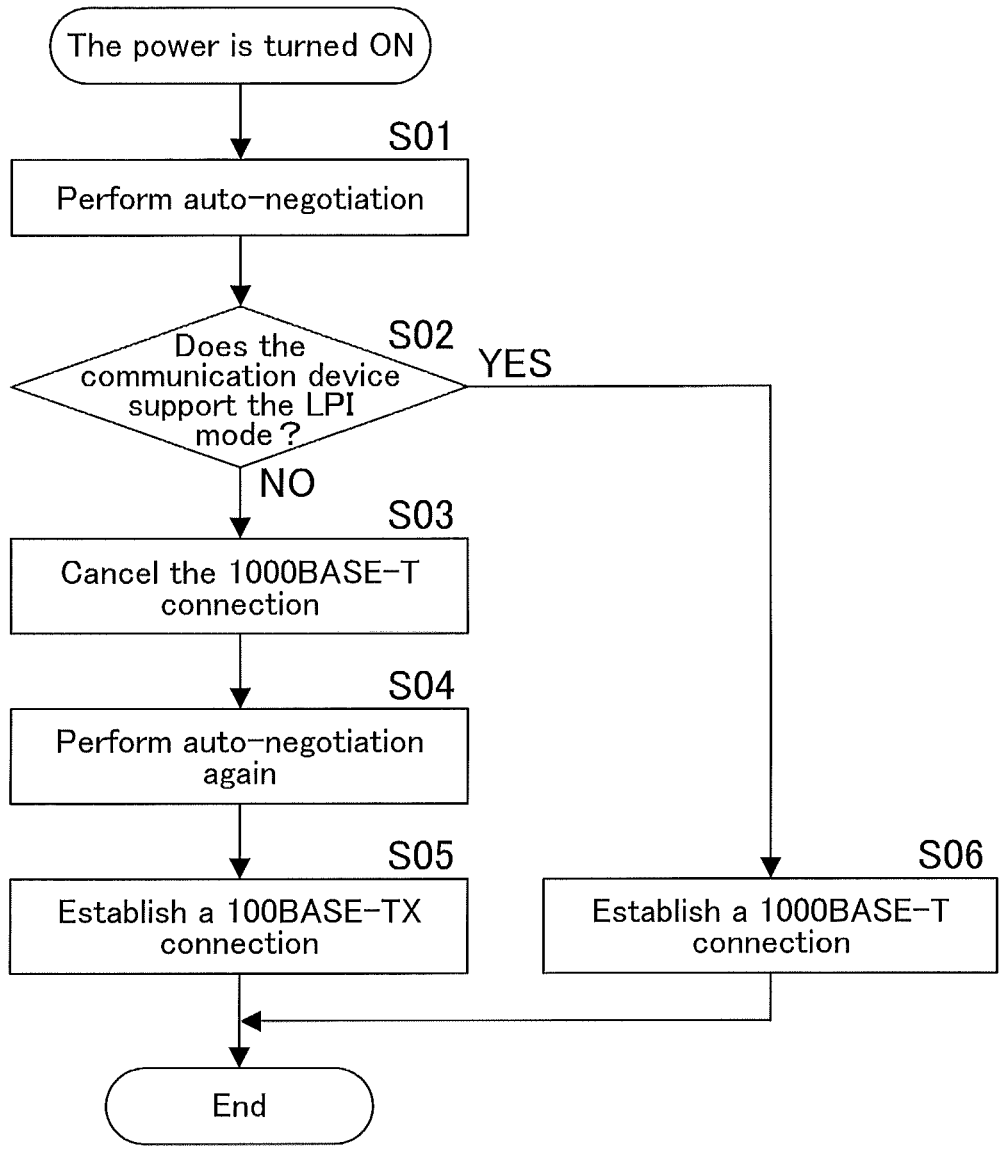
FIG. 5 is a flowchart representing an operation to establish a connection to the communication device, which is performed by the image processing apparatus.

FIG. 5 illustrates a flowchart representing a processing routine for the image processing apparatus 1 to establish a connection to the communication device 2 in the "power adjustment mode" as described above. This processing routine is executed by the MAC device 110 of the image processing apparatus 1 according to a program stored on the MAC device 110 itself, or by the CPU 120 according to a program stored on a recording medium not illustrated in any figures.

When the power of the image processing apparatus 1 is turned ON, auto-negotiation is performed in Step S01, and it is judged in Step S02 whether or not the communication device 2 on the other end of the connection supports the LPI mode.

If the communication device 2 supports the LPI mode (YES in Step S02), a connection to the communication device 2 is established based on a default setting type, 1000BASE-T, in Step S06. This makes it possible to achieve low power consumption by using the LPI mode during an idle connection with the communication device 2 and conduct a smooth data communication at a high communication rate, 1000 Mbps.

If the communication device 2 does not support the LPI mode (NO in Step S02), the default setting, the 1000BASE-T connection is canceled in Step S03, auto-negotiation is again performed in Step S04, and a connection to the communication device 2 is established based on 100BASE-TX in Step S05.

As described above, if the communication device 2 does not support the LPI mode, a connection to the communication device 2 is established at 100 Mbps. This makes it possible to achieve lower power consumption during idle connection than that which could be achieved with the default setting rate, 1000 Mbps, during idle connection.

In this embodiment, the image processing apparatus 1 is allowed to achieve low power consumption during idle connection without the need to uselessly slow down the communication rate, by employing a suitable communication rate depending on whether or not the communication device 2 on the other end of the connection supports the LPI mode.

Hereinafter, a second embodiment of the present invention will be described.

In this embodiment, the power adjustment mode will be described.

Even if the physical layer device 200 supports the LPI mode, a broad/multicasting's network occupancy, i.e. a network utilization rate, which satisfies the following inequality 1 when using a 1 Gbps connection, would interfere with power savings in the LPI mode. In such a case, it would be better to use a 100 Mbps connection, resulting in successfully reducing power consumption for a comprehensive time including both idle connection and active communication. Therefore, the communication rate is switched to 100 Mbps when the power of the image processing apparatus 1 is turned ON again.

$$W2 \cdot X + W3 \cdot (1-X) > W1 \quad \text{Inequality 1:}$$

In the inequality 1, W1 represents power with a 100 Mbps connection, W2 represents power with a 1 Gbps connection, W3 represents power in the LPI mode, and X represents the network utilization rate.

That is, when the network utilization rate with a 1 Gbps connection grows, the value of the section W2·X gets greater than ever, and the value of the section W3·(1−X), which represents the impact of power savings, gets less than ever, resulting in that the value on the left-hand side of the inequality gets greater than W1 on the other side of the inequality, which represents power with a 100 Mbps connection. To solve this situation, the communication rate is switched to 100 Mbps when the power of the image processing apparatus 1 is turned ON again.

Figure 6:
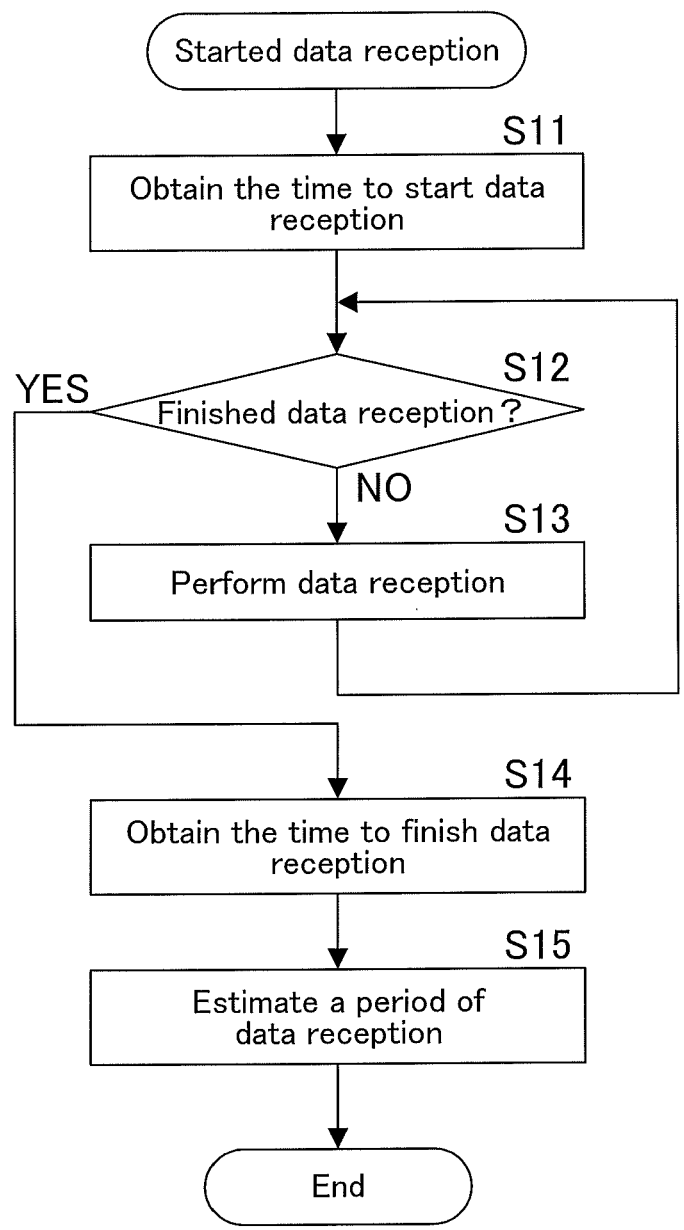
FIG. 6, which relates to another embodiment of the present invention, is a flowchart representing an operation to estimate a period of time required for receiving data, which is necessary for estimating a network utilization rate.
Figure 7:
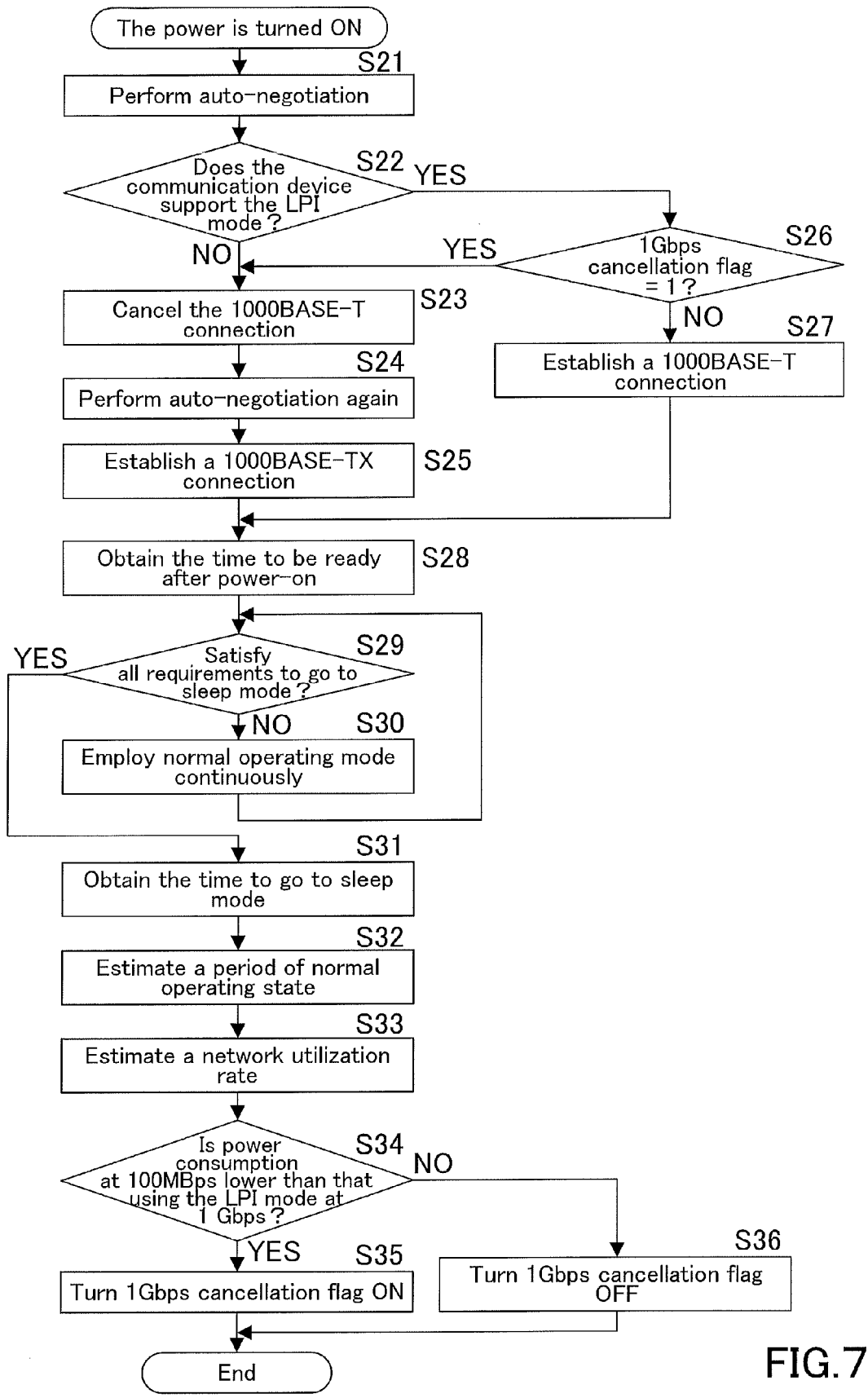
FIG. 7, which relates to yet another embodiment of the present invention, is a flowchart representing an operation to establish a connection to the communication device.

FIGS. 6 and 7 are flowcharts representing the operations of the image processing apparatus 1 as described above in the second embodiment. This processing routine is executed by the MAC device 110 of the image processing apparatus 1 according to a program stored on the MAC device 110 itself, or by the CPU 120 according to a program stored on a recording medium not illustrated in any figures.

FIG. 6 is a flowchart representing an operation to estimate a period of time required for receiving data, which is necessary for estimating a network utilization rate.

In Step S11, the time to start data reception is obtained. Then it is judged in Step S12 whether or not data reception has been finished.

If data reception has not been finished yet (NO in Step S12), data reception is performed in Step S13, then the processing routine returns to Step S12. If data reception has been finished (YES in Step S1254), the processing routine proceeds to Step S14.

In Step S14, the time to finish data reception is obtained. Then in Step S15, a period of data reception is estimated based on the time to start data reception, which is obtained in Step S11, and the time to finish data reception, which is obtained in Step S14, respectively.

FIG. 7 is a flowchart representing an operation to establish a connection to the communication device 2.

When the power of the image processing apparatus 1 is turned ON, auto-negotiation is performed in Step S21, and it is judged in Step S22 whether or not the communication device 2 supports the LPI mode.

If the communication device 2 supports the LPI mode (YES in Step S22), then it is judged in Step S26 whether or not the 1 Gbps cancellation flag indicates 1. If the 1 Gbps cancellation flag indicates 1 (YES in Step S26), the processing routine proceeds to Step S23. IF the 1 Gbps cancellation flag does not indicate 1 (NO in Step S26), a connection to the communication device 2 is established based on 1000BASE-T in Step S28.

Back to Step S22, if the communication device 2 does not support the LPI mode (NO in Step S22), the 1000BASE-T connection is cancelled in Step S23, auto-negotiation is again performed in Step S24, and a connection to the communication device 2 is established based on 100BASE-TX in Step S25. After that, the processing routine proceeds to Step S28.

In Step S28, the time to be ready after power-on is obtained. Then it is judged in Step S29 whether or not all requirements to go to sleep mode which is power-saving mode are satisfied.

If all requirements to go to sleep mode are not satisfied (NO in Step S29), normal operating mode is continuously employed in Step S30, then the processing routine returns to Step S29. If all requirements to go to sleep mode are satisfied (YES in Step S29), the processing routine proceeds to Step S31.

In Step S31, the time to go to sleep mode is obtained. Then a period of normal operating state is estimated in Step S32. The period of normal operating state is estimated by subtracting the time to be ready after power-on, which is obtained in Step S28, from the time to go to sleep mode, which is obtained in Step S31.

Subsequently, a network utilization rate (network occupancy) is estimated in Step S33. The network utilization rate is estimated by dividing the period of data reception, which is estimated in Step S15 of FIG. 6, by the period of normal operating state, which is estimated in Step S32.

In Step S34, it is judged whether or not the current state meets the inequality 1, i.e. whether or not power consumption at 100 MBps is lower than that using the LPI mode at 1 Gbps. If power consumption at 100 Mbps is lower than the other (YES in Step S34), the 1 Gbps cancellation flag is turned ON (the flag is set to 1) in Step S35. If power consumption at 100 Mbps is not lower than the other (NO in Step S34), the 1 Gbps cancellation flag is turned OFF (the flag is set to 0) in Step S36.

When the power of the image processing apparatus 1 is first turned ON after the 1 Gbps cancellation flag is turned ON, the communication rate is switched to 100 Mbps (Step S25) from 1000 Mbps (Step S23) by the 1 Gbps cancellation flag indicating 1 (YES in Step S26), even if the communication device 2 supports the LPI mode (YES in Step S22). This makes it possible to achieve lower power consumption than that which could be achieved with a 1 Gbps connection using the LPI mode.

Some embodiments of the present invention have been described in the foregoing specification, which does not mean that the present invention shall be construed as limited to the particular forms disclosed.

For example, in these embodiments in the foregoing specification, 100 Mbps and 1 Gbps are employed as a first and second communication rate, respectively. However, it should not be understood that a first and second communication rates need to be limited to these values, but just should be understood that a second communication rate needs to be greater than a first communication rate.

The present invention having been described above may be applied to the following modes.

[1] An image processing apparatus being configured to support a power-saving mode which allows achieving low power consumption while keeping an idle connection without communication between the image processing apparatus and a communication device in a network environment, the image processing apparatus comprising:
a first judgment portion which judges whether or not the communication device supports the power-saving mode; and
a communicator which establishes a connection to the communication device at a first communication rate if the first judgment portion judges that the communication device does not support the power-saving mode, at a second communication rate which is faster than the first communication rate if the first judgment portion judges that the communication device supports the power-saving mode.

[2] The image processing apparatus as recited in the aforementioned item [1], further comprising:
a measurement portion which measures a network utilization rate;
a second judgment portion which judges whether or not the network utilization rate obtained by the measurement portion has grown enough to cancel out the power-saving effect of the power-saving mode; and
a switch which allows, if the second judgment portion judges that the network utilization rate obtained by the measurement portion has grown enough to cancel out the power-saving effect of the power-saving mode, the connection to switch from the second communication rate to the first communication rate, when the image processing apparatus is first supplied with power after establishing the connection of the second communication rate because of having judged that the communication device supports the power-supply mode.

[3] The image processing apparatus as recited in the aforementioned item [2,] wherein:
if the following inequality: $W2 \cdot X + W3 \cdot (1-X) > W1$ is true, the second judgment portion judges that the network utilization rate obtained by the measurement portion has grown enough to cancel out the power-saving effect of the power-saving mode; and
W1 represents power with the first communication rate, W2 represents power with the second communication rate, W3 represents power in the power-saving mode, and X represents the network utilization rate.

[4] A communication method for an image processing apparatus being configured to support a power-saving mode which allows achieving low power consumption while keeping an idle connection without communication between the image processing apparatus and a communication device in a network environment, the communication method comprising:
judging whether or not the communication device supports the power-saving mode; and
establishing a connection to the communication device at a first communication rate if it is judged that the communication device does not support the power-saving mode, at a second communication rate which is faster than the first communication rate if it is judged that the communication device supports the power-saving mode.

[5] The communication method for the image processing apparatus, as recited in the aforementioned item [4], further comprising:
measuring a network utilization rate;
judging whether or not the network utilization rate obtained by measurement has grown enough to cancel out the power-saving effect of the power-saving mode; and
allowing, if it is judged that the network utilization rate obtained by measurement has grown enough to cancel out the power-saving effect of the power-saving mode, the connection to switch from the second communication rate to the first communication rate, when the image processing apparatus is first supplied with power after establishing the connection of the second communication rate because of having judged that the communication device supports the power-supply mode.

[6] The communication method for the image processing apparatus, as recited in the aforementioned item [5], wherein:
if the following inequality: $W2 \cdot X + W3 \cdot (1-X) > W1$ is true, it is judged that the network utilization rate obtained by measurement has grown enough to cancel out the power-saving effect of the power-saving mode; and
W1 represents power with the first communication rate, W2 represents power with the second communication rate, W3 represents power in the power-saving mode, and X represents the network utilization rate.

[7] A non-transitory computer-readable recording medium with a communication program being stored thereon to make a computer of an image processing apparatus being configured to support a power-saving mode which allows achieving low power consumption while keeping an idle connection without communication between the image processing apparatus and a communication device in a network environment, execute:

judging whether or not the communication device supports the power-saving mode; and establishing a connection to the communication device at a first communication rate if it is judged that the communication device does not support the power-saving mode, at a second communication rate which is faster than the first communication rate if it is judged that the communication device supports the power-saving mode.

[8] The non-transitory computer-readable recording medium with the communication program being stored thereon to make the computer of the image processing apparatus, as recited in the aforementioned item [7], further execute:

measuring a network utilization rate;

judging whether or not the network utilization rate obtained by measurement has grown enough to cancel out the power-saving effect of the power-saving mode; and allowing, if it is judged that the network utilization rate obtained by measurement has grown enough to cancel out the power-saving effect of the power-saving mode, the connection to switch from the second communication rate to the first communication rate, when the image processing apparatus is first supplied with power after establishing the connection of the second communication rate because of having judged that the communication device supports the power-supply mode.

[9] The non-transitory computer-readable recording medium with the communication program being stored thereon to make the computer of the image processing apparatus, as recited in the aforementioned item [8], execute processing, wherein:

if the following inequality: $W2 \cdot X + W3 \cdot (1-X) > W1$ is true, it is judged that the network utilization rate obtained by measurement has grown enough to cancel out the power-saving effect of the power-saving mode; and $W1$ represents power with the first communication rate, $W2$ represents power with the second communication rate, $W3$ represents power in the power-saving mode, and $X$ represents the network utilization rate.

According to the inventions in the aforementioned items [1] and [4], it is judged whether or not a communication device supports a power-saving mode allowing achieving low power consumption while keeping an idle connection without communication between an image processing apparatus and the communication device in a network environment, and if the communication device turns out to support the power-saving mode, a connection between them is established at a second communication rate which is faster than a first communication rate. This makes it possible to achieve low power consumption during an idle connection between them and achieve smooth traffic flow of the second communication rate, a faster one, during a data communication between them. On the other hand, if the communication device turns out not to support the power-saving mode, a connection between them is established at the first communication rate. This makes it possible to achieve lower power consumption during idle connection than that which could be achieved with the second communication rate during idle connection.

As described above, a suitable communication rate is employed depending on whether or not the communication device supports a power-saving mode which allows achieving low power consumption during idle connection, resulting in achieving low power consumption during idle connection, without the need to uselessly slow down the communication rate.

According to the inventions in the aforementioned items [2] and [5], if the network utilization rate has grown enough to cancel out the power-saving effect of the power-saving mode, no power-saving effect of the power-saving mode could not be expected even after a connection of the second communication rate is established because the communication device turns out to support the power-saving mode. In order to keep achieving low power consumption, it is necessary to switch the connection to the first communication rate, when the image processing apparatus is supplied with power.

According to the inventions in the aforementioned items [3] and [6], whether or not the network utilization has grown enough to cancel out the power-saving effect of the power-saving mode can be judged properly.

According to the invention in the aforementioned item [7], the computer of the image processing apparatus is allowed to establish a connection to the communication device at a first communication rate if the communication device turns out not to support the power-saving mode, at a second communication rate which is faster than the first communication rate if the communication device turns out to support the power-saving mode.

According to the invention in the aforementioned item [8], the computer of the image processing apparatus is allowed, if the network utilization rate has grown enough to cancel out the power-saving effect of the power-saving mode, to switch the connection from the second communication rate to the first communication rate, when the image processing apparatus is first supplied with power after establishing the connection of the second communication rate because the communication device turns out to support the power-saving mode.

According to the invention in the aforementioned item [9], the computer of the image processing apparatus is allowed to properly judge whether or not the network utilization rate has grown enough to cancel out the power-saving effect of the power-saving mode.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a)

"means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing apparatus being configured to support a power-saving mode which allows achieving low power consumption while keeping an idle connection without communication between the image processing apparatus and a communication device in a network environment, the image processing apparatus comprising:
    a first judgment portion which judges whether or not the communication device supports the power-saving mode; and
    a communicator which establishes a connection to the communication device at a first communication rate if the first judgment portion judges that the communication device does not support the power-saving mode, at a second communication rate which is faster than the first communication rate if the first judgment portion judges that the communication device supports the power-saving mode.

2. The image processing apparatus as recited in claim 1, further comprising:
    a measurement portion which measures a network utilization rate;
    a second judgment portion which judges whether or not the network utilization rate obtained by the measurement portion has grown enough to cancel out the power-saving effect of the power-saving mode; and
    a switch which allows, if the second judgment portion judges that the network utilization rate obtained by the measurement portion has grown enough to cancel out the power-saving effect of the power-saving mode, the connection to switch from the second communication rate to the first communication rate, when the image processing apparatus is first supplied with power after establishing the connection of the second communication rate because of having judged that the communication device supports the power-supply mode.

3. The image processing apparatus as recited in claim 2, wherein:
    if the following inequality: $W2 \cdot X + W3 \cdot (1-X) > W1$ is true, the second judgment portion judges that the network utilization rate obtained by the measurement portion has grown enough to cancel out the power-saving effect of the power-saving mode; and
    W1 represents power with the first communication rate, W2 represents power with the second communication rate, W3 represents power in the power-saving mode, and X represents the network utilization rate.

4. A communication method for an image processing apparatus being configured to support a power-saving mode which allows achieving low power consumption while keeping an idle connection without communication between the image processing apparatus and a communication device in a network environment, the communication method comprising:
    judging whether or not the communication device supports the power-saving mode; and
    establishing a connection to the communication device at a first communication rate if it is judged that the communication device does not support the power-saving mode, at a second communication rate which is faster than the first communication rate if it is judged that the communication device supports the power-saving mode.

5. The communication method for the image processing apparatus, as recited in claim 4, further comprising:
    measuring a network utilization rate;
    judging whether or not the network utilization rate obtained by measurement has grown enough to cancel out the power-saving effect of the power-saving mode; and
    allowing, if it is judged that the network utilization rate obtained by measurement has grown enough to cancel out the power-saving effect of the power-saving mode, the connection to switch from the second communication rate to the first communication rate, when the image processing apparatus is first supplied with power after establishing the connection of the second communication rate because of having judged that the communication device supports the power-supply mode.

6. The communication method for the image processing apparatus, as recited in claim 5, wherein:
    if the following inequality: $W2 \cdot X + W3 \cdot (1-X) > W1$ is true, it is judged that the network utilization rate obtained by measurement has grown enough to cancel out the power-saving effect of the power-saving mode; and
    W1 represents power with the first communication rate, W2 represents power with the second communication rate, W3 represents power in the power-saving mode, and X represents the network utilization rate.

7. A non-transitory computer-readable recording medium with a communication program being stored thereon to make a computer of an image processing apparatus being configured to support a power-saving mode which allows achieving low power consumption while keeping an idle connection without communication between the image processing apparatus and a communication device in a network environment, execute:
    judging whether or not the communication device supports the power-saving mode; and
    establishing a connection to the communication device at a first communication rate if it is judged that the communication device does not support the power-saving mode, at a second communication rate which is faster than the first communication rate if it is judged that the communication device supports the power-saving mode.

8. The non-transitory computer-readable recording medium with the communication program being stored thereon to make the computer of the image processing apparatus, as recited in claim 7, further execute:
    measuring a network utilization rate;

judging whether or not the network utilization rate obtained by measurement has grown enough to cancel out the power-saving effect of the power-saving mode; and allowing, if it is judged that the network utilization rate obtained by measurement has grown enough to cancel out the power-saving effect of the power-saving mode, the connection to switch from the second communication rate to the first communication rate, when the image processing apparatus first is first supplied with power after establishing the connection of the second communication rate because of having judged that the communication device supports the power-supply mode.

9. The non-transitory computer-readable recording medium with the communication program being stored thereon to make the computer of the image processing apparatus, as recited in claim 8, execute processing, wherein:

if the following inequality: $W2 \cdot X + W3 \cdot (1-X) > W1$ is true, it is judged that the network utilization rate obtained by measurement has grown enough to cancel out the power-saving effect of the power-saving mode; and $W1$ represents power with the first communication rate, $W2$ represents power with the second communication rate, $W3$ represents power in the power-saving mode, and $X$ represents the network utilization rate.

* * * * *